US008700617B2

(12) United States Patent
Bird et al.

(10) Patent No.: US 8,700,617 B2
(45) Date of Patent: *Apr. 15, 2014

(54) MANAGING FEEDBACK IN A GROUP RESOURCE ENVIRONMENT

(75) Inventors: Colin Leonard Bird, Eastleigh (GB); Andrew Connick, London (GB); Nicholas James Hill, Southampton (GB); Mark James Hiscock, Eastleigh (GB); Sebastian Stein, Ahrensburgh (DE); Stephen Woolley, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 2195 days.

This patent is subject to a terminal disclaimer.

(21) Appl. No.: 11/289,065

(22) Filed: Nov. 29, 2005

(65) Prior Publication Data
US 2006/0149759 A1 Jul. 6, 2006

(30) Foreign Application Priority Data

Dec. 30, 2004 (GB) .................................. 0428482.4

(51) Int. Cl.
*G06F 7/00* (2006.01)
*G06F 17/30* (2006.01)

(52) U.S. Cl.
USPC ............................ 707/726; 707/748; 709/226

(58) Field of Classification Search
USPC .................................... 707/726, 748, 999.102
See application file for complete search history.

(56) References Cited

U.S. PATENT DOCUMENTS

| 5,724,567 | A  | * | 3/1998  | Rose et al. ............. 707/999.002 |
| 5,821,749 | A  | * | 10/1998 | Booker ......................... 324/240 |
| 5,822,749 | A  |   | 10/1998 | Agarwal |
| 6,438,579 | B1 |   | 8/2002  | Hosken |
| 6,519,764 | B1 | * | 2/2003  | Atkinson et al. .............. 717/120 |
| 6,601,062 | B1 |   | 7/2003  | Deshpande et al. |
| 6,601,602 | B2 | * | 8/2003  | Adler et al. .............. 137/115.23 |
| 6,606,619 | B2 |   | 8/2003  | Ortega et al. |
| 6,681,247 | B1 | * | 1/2004  | Payton .......................... 709/217 |

(Continued)

FOREIGN PATENT DOCUMENTS

GB 2352542 A 1/2001

OTHER PUBLICATIONS

Anderson et al., "Effects of User Similarity in Social Media", ACM, WSDM 2012.*

(Continued)

*Primary Examiner* — Daniel Kuddus
(74) *Attorney, Agent, or Firm* — Yee & Associates, P.C.; David A. Mims, Jr.

(57) ABSTRACT

A system, method and computer program for managing resources within an integrated development environment for multiple users. The resources include both content resources and people resources. The method comprises: managing a plurality of nodes representing resources, the nodes including content nodes and person nodes, wherein the node contains a resource reference for referencing the resource; managing one or more links representing one or more relationships between the resources, the links including links between content nodes, between person nodes and between content and person nodes, each link comprising node references to identify the nodes in the relationships and an importance value to identify the importance of the relationship; providing an interface for selecting one of the plurality of content nodes or person nodes; adapting, in response to the user selected node, one or more importance values of certain links.

9 Claims, 13 Drawing Sheets

(56) References Cited

U.S. PATENT DOCUMENTS

| | | | |
|---|---|---|---|
| 6,801,062 B2* | 10/2004 | Okada | 327/108 |
| 7,225,184 B2 | 5/2007 | Carrasco et al. | |
| 7,877,391 B2 | 1/2011 | Bird et al. | |
| 2002/0077887 A1* | 6/2002 | London Shrader et al. | 705/12 |
| 2003/0037074 A1* | 2/2003 | Dwork et al. | 707/500 |
| 2003/0050916 A1* | 3/2003 | Ortega et al. | 707/1 |
| 2003/0208399 A1 | 11/2003 | Basak et al. | |
| 2003/0220984 A1* | 11/2003 | Jones et al. | 709/219 |
| 2004/0083232 A1 | 4/2004 | Ronnewinkel et al. | |
| 2004/0220963 A1* | 11/2004 | Chen et al. | 707/103 R |
| 2005/0015366 A1* | 1/2005 | Carrasco et al. | 707/3 |
| 2005/0144158 A1* | 6/2005 | Capper et al. | 707/3 |
| 2006/0149757 A1 | 7/2006 | Bird et al. | |
| 2006/0208399 A1 | 9/2006 | Wei | |

OTHER PUBLICATIONS

Proceedings of International Conference on Software Engineering, May 2003. Hipikat: Recommending Pertinent Software Artifacts. Davor Cubranic, Gail C Murphy.

Market-Based Recommendations: Design, Simulation and Evaluation. Yan Zheng Wei, Luc Moreau, Nicholas R Jennings.

Actix Provides Push-To-Talk Service Optimization for GSM/GPRS Networks.

IBM Pending Application "Method and Apparatus for a Cache in a Group Resource Environment" Colin Leonard Bird et al.

IBM Pending Application "Method and Apparatus for Managing Recommendations in a Group Resource Environment" Colin Leonard Bird et al.

"Actix Provides Push-To-Talk Service Optimization for GSM/GPRS Networks," Mobile Europe, Mar. 2004, 4 pages, accessed Jun. 3, 2013, http://www.mobileeurope.co.uk/Press-Wire/2355.

Office Action dated Dec. 12, 2007 regarding USPTO U.S. Appl. No. 11/272,522, 32 pages.

Final Office Action dated Jul. 16, 2008 regarding USPTO U.S. Appl. No. 11/272,522, 21 pages.

Final Office Action dated Mar. 22, 2010 regarding USPTO U.S. Appl. No. 11/272,522, 20 pages.

Notice of Allowance dated Sep. 16, 2010 regarding USPTO U.S. Appl. No. 11/272,522, 12 pages.

Office Action dated Dec. 7, 2007 regarding USPTO U.S. App. No. 11/272,512, 37 pages.

Final Office Action dated Oct. 31, 2008 regarding USPTO U.S. Appl. No. 11/272,512, 27 pages.

* cited by examiner

Feedback Component 18

- general decay agent 50
- exposure decay agent 51
- basic agent 52
- time agent 53
- person agent 54
- person time agent 55
- transition agent 56
- collaborative agent 57
- user navigation history 58

Figure 5

MANAGING FEEDBACK IN A GROUP RESOURCE ENVIRONMENT

This invention relates to a method and apparatus for managing a large body of information in a multiple user environment. In particular, this invention relates to method and apparatus for managing user feedback on a resource model within an integrated development environment (IDE).

BACKGROUND

Large companies often possess very rich collections of information in the form of electronic documents. This data is steadily increasing and a single software project can easily draw upon hundreds or thousands of sources of information. These might be design documents, UML diagrams, white papers or source code as well as indirectly related information—perhaps a previous product from the same team, external webpages and reference manuals. There is currently little software support for organising this body of information into an easily navigable network of references, not to mention integrate it into commonly used development suites.

One well known framework for organising large bodies of information is the Semantic Web. The term was first coined by Tim Berners-Lee et al. in 2001 and is the idea of having data on the web defined and linked in a way, that it can be used by machines—not just for display purposes, but for using it in various applications. The Semantic Web is a collaborative effort led by W3C with participation from a large number of researchers and industrial partners. The Semantic Web is based on the Resource Description Framework (RDF), which integrates a variety of applications using XML for syntax and URIs for naming. The RDF framework adopted by the Semantic Web community is used to develop the preferred embodiment of the present invention.

Another system, Alexa, is a web search engine that uses the notion of related links between web pages to refine its search results and present the most relevant information.

Hipikat is a group memory tool for the Eclipse IDE developed by Davor Cubranic at University of British Columbia. Hipikat is intended to solve the problem of information overload in a software environment where it is often difficult for a software developer to locate the right information amongst the huge amount of data stored. Hipikat recommends relevant software development artefacts based on the context in which a developer requests help from Hipikat. Hipikat using artefacts in a group environment and makes recommendations based on the artefacts it is aware of.

A market-based recommender system has been described in 'Market-based recommendations: design, simulation and evaluation' Yan Zheng Wei, Luc Moreau and Nicholas R. Jennings, Department of Electronics and Computer Science, University of Southampton (2003) Proc 2nd Int. Jount Cont. Or Autonomous Agents and Multi-Agent Systems, Melbourne, Australia, 600-607. The key feature of the system is the use of market mechanisms to short list recommendations of artefacts in decreasing order of user perceived quality.

Neither of the two prior art examples model, adapt and collate the importance of the relationships between the artefacts.

SUMMARY OF INVENTION

According to a first aspect of the present invention there is provided a method as described in claim 1.

Other aspects are described below and recited in the claims.

The first aspect offers a general solution for the management of information. The information is modelled like a network in which the nodes of the network are the information sources and are linked according to their semantic relationships. This enables users to navigate documents easily by viewing only the entities that are related to a particular piece of information. For example, when the user views the source file of a module, he/she would be able to navigate directly to the design document that describes it in detail, and then perhaps to a document that explains how the module is embedded in the high-level system architecture.

Due to the large amount of information available and the difficulty of manually structuring it, the semantic network is to a large extent self-organising. It adapts dynamically to usage and learns relationships between documents over time. Metadata about information is extracted automatically where possible, but the network requires some manual feedback and management for further refinement.

The preferred embodiment (named Synapse) was originally proposed as a tool for software development projects, but may be used to organise any type of knowledge. For further flexibility, the network is stored on a server and communicates with clients via an XML-based protocol that makes integration into almost any kind of application possible.

Initially, a client for the Eclipse environment is proposed. This will allow developers to navigate the semantic network and work on their software projects from a single platform.

DESCRIPTION OF DRAWINGS

In order to promote a fuller understanding of this and other aspects of the present invention, a preferred embodiment of the invention will now be described, by means of example only, with reference to the accompanying drawings in which:

FIG. 5 is a schematic of the feedback component;

DESCRIPTION OF THE EMBODIMENTS

Figure 1:
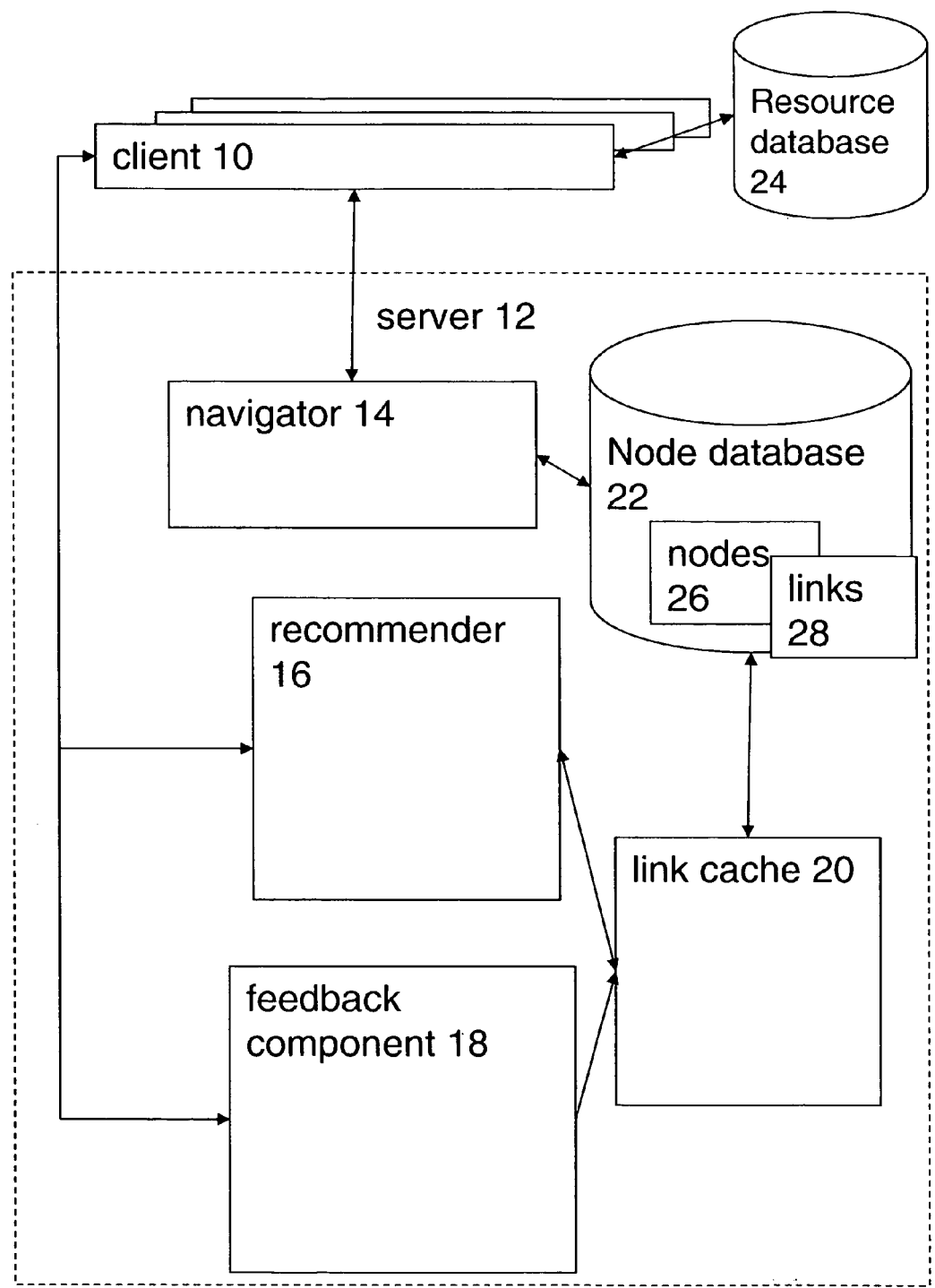
FIG. 1 is a schematic of a synapse server; synapse clients; and an external resource database.

Referring to FIG. 1, the preferred embodiment comprises: a synapse client 10 and a synapse server 12. The synapse server 12 comprises: a navigator 14; a recommender 16; a feedback component 18; a link cache 20 and a node database 22. A resource database 24 that is not part of the preferred embodiment is accessible from a synapse client 10. The node database 22 stores data entities called nodes 26 and links 28. A node 26 represents a resource in the world and a link 28 represents a relationship between two resources including an importance value for the relationship. Each client 10 interfaces the navigator 14, the recommender 16 and the feedback component 18.

The recommender 16 recommends nodes 26 that the user is likely to access next; some of the recommended nodes may not have been accessed before by a user and many will have already been accessed. If a client 10 selects a recommended resource then a new resource request is sent and the content for that selected node is transferred from the node database 22 via the navigator 14 as before.

The feedback component 18 decreases and increases the importance of links 28 based on a number of factors; links 28 with an importance below a certain threshold will be deleted.

Changing a link value in slow persistent memory would be inefficient because of the frequency of link modifications performed. The link cache 20 is a fast non-persistent cache that holds copies of appropriate links in the persistent memory. The number of modifications to links is high because it is a multiple of the number of users and number of agents within the feedback component. Furthermore, simply writing back all links 28 after they are modified would have a major impact on the load of the database because there would be so many read and write accesses. Therefore access of the links 28 is controlled in the link cache solution discussed below.

Figure 2:
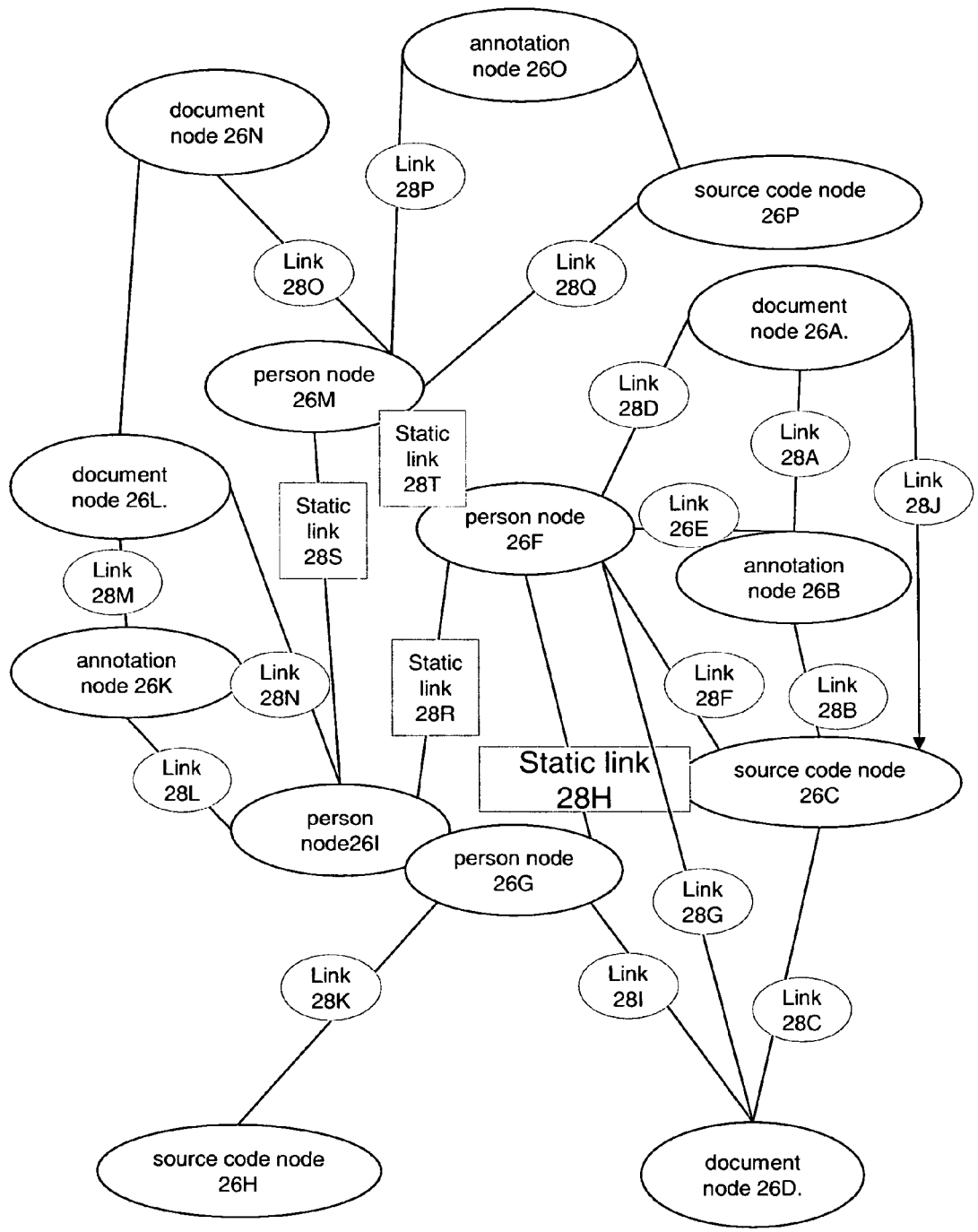
FIG. 2 is a schematic of an example synaptic web of nodes and links in the node database.

FIG. 2 shows an example of an arrangement of nodes 26A TO 26P and links 28A TO 28R. The node database 22 stores nodes 26 and links 28 in the form of a data structure representing resources and their relationships; in this specification the data structure is sometimes referred to in this description as a Synaptic Web. A resource can be a person who is a user of the system. A resource can also be a shared resource such as a program file or a document.

A node 26 generally points to a resource external to the client server system. However a node 26 can also point to content which is part of the node 26 or can point to a document internal to the client server system; such a node 26 is pointing to an internal content resource. In this embodiment there are three different types of node 26: a person node represents a person resource; a content node represents a content resource such as an external or internal document or source code; and an annotation node that annotates another resource. A person node contains the information about a person. Each node 26 comprises a unique resource identifier (URI) and metadata about the resource. The URI describes (in most cases) where the associated resource is located. The exceptions are when the resource isn't a shared digital resource, for example, the URI for a person node could just be something like person:<username>, where <username> is their username. The metadata includes important keywords and a brief abstract. A node does not contain the actual content, which might be stored in a remote file repository, the Internet or even in non-digital form as books and articles.

In the preferred embodiment a link 28 represents a relationship between two specific resources. A link 28 comprises two URIs of the respective resources; the two URIs identify both the associated nodes and resources. A dynamic link defines an importance value representing the priority of the link within the system of links. A static link has no importance value and represents a fixed relationship between two resources such as employee/manager relationship. In this embodiment a dynamic link comprises the URIs of the referencing resource and the referenced resource and the link importance is given a value between 0 and 1. The preferred embodiment is mostly concerned with dynamic links.

The node database 22 is initially created in a similar way to conventional semantic webs. Firstly nodes are identified and created based on the current information available, with metadata (mainly keywords) stored in each node based on the entity which it represents. Secondly, links 28 between related nodes 26 are identified, this process includes assigning starting values to each link signifying its level of importance. As well as the importance value, more qualitative information may be associated with each link 28, describing the type of relationship that it represents, for example, whether one node is owned or owns another node or is contained in another node.

Once the node database has been created, the importance of the links are changed by the system based on various factors including the users' use of the nodes as will be described subsequently. There are two general points to note about these types of importance changing factors. Firstly each action produces only a relatively small change in the weight of the link. This would mean for example that someone navigating randomly between nodes would not influence the strength of their link noticeably, but many people doing it over time would gradually strengthen the link. Secondly the amount by which these actions modify the strength should not be fixed, but rather depend on other factors such as the current strength of the link, global properties of the web, and possibly the user performing the action.

To offset this gradual increase in link importance, the importance of all of the links will fade over time, cancelling out noise in the web and building in a chronological relevancy to the importance of the links. This again will not simply be a linear decay, but depend on current properties of the web. Where links do not exist, these dynamic processes may induce the creation of a new weak link, which then may strengthen over time.

Schema for Objects and Relationships

The Resource Description Framework (RDF) is a W3C standard language for representing information about resources in the World Wide Web. There are advantages of using RDF as a basis for nodes 26 and links 28. Firstly, it represents collaboration between major software corporations and research institutions so should be a technically sound specification and would hopefully be an ideal format for storing semantic information. Utilities, libraries and other resources are also quite widely available already. Secondly, it may be possible in the future for the Synaptic Web to be "joined" to other webs (increasing the amount of information "known") and a common language for storing the metadata would help to facilitate this.

Nodes 26 are uniquely identified using web identifiers (URIrefs), and are described in terms of properties and property values. In this way RDF provides a simple way to make statements about Web resources. An RDF statement is a triple comprising:

A subject (the resource the statement is about, for example a book)

A predicate (the property or characteristic of the subject that the statement specifies, for example "author")

An object (the value of the property or characteristic, for example the name of the author)

In general statements in RDF represent binary relationships, so the description of a resource may contain any number of RDF statements reflecting the different type of semantic links between resources. In fact URIrefs are used to identify subjects, predicates and objects, because this allowed each to be identified absolutely which removes ambiguity between people with the same name, predicates with the same labels but different meanings etc. It also allows those entities to be further specified. Full specifications for RDF and associated technologies may be found at the W3C RDFCore Working Group web site. The "RDF Primer" is a good starting point.

Statements made in RDF may be visualised as a graph, and the serialisation of that graph for storage or transmission is handled by RDF/XML, which is an XML-based syntax for representing the information. Synapse will use RDF/XML to store the information it encapsulates, but to achieve this it is first important to demonstrate that the concepts already discussed for the format and structure of the Synaptic Web may be equivalently represented using RDF/XML. The end result of this analysis will be an RDF Schema describing exactly what classes exist and what metadata should be stored against each. The RDF Schema itself is also an RDF/XML document. For more information about RDF Schema see the related W3C specifications.

Nodes 26 and links 28 are the conceptual structure of the Synaptic Web as represented in RDF. A node is directly equivalent to an RDF resource, and the use of URIrefs to uniquely identify resources is a sensible constraint for our implementation.

There are some properties that should be stored for all nodes, so a "SynapticNode" super-class may be defined from which all other classes of node to be stored in the Synaptic Web may be derived. The definition of the class representing a "SynapticNode" is as follows:

```
<rdf:Description rdf:ID="SynapticNode">
    <rdf:type
      rdf:resource="http://www.w3.org/2000/01/rdf-schema#Class"/>
</rdf:Description>
```

The following properties for nodes are defined in RDF: internal identifier; name; keyword; abstract.

1. internal identifier for the resource A class for SynapticNodeIdentifier is also defined so the identifier may be structured in some way.

```
<rdf:Description rdf:ID="SynapticNodeIdentifier">
    <rdf:type rdf:resource="http://www.w3.org/2000/01/rdf-schema#Class"/>
</rdf:Description>
<rdf:Description rdf:ID="snid">
    <rdf:type rdf:resource="http://www.w3.org/1999/02/22-rdf-syntax-ns#Property"/>
    <rdfs:domain rdf:resource="#SynapticNode"/>
    <rdfs:range rdf:resource="#SynapticNodeIdentifier"/>
</rdf:Description>
```

2. name: Descriptive name for the resource, so a simple string will do.

```
<rdf:Description rdf:ID="name">
    <rdf:type rdf:resource="http://www.w3.org/1999/02/22-rdf-syntax-ns#Property"/>
    <rdfs:domain rdf:resource="#SynapticNode"/>
    <rdfs:range rdf:resource="http://www.w3.org/2001/XMLSchema#string"/>
</rdf:Description>
```

3. keyword: Keywords for nodes should be simple strings. In practise a resource should define a Bag containing all the keywords that apply to it. Furthermore, the literal keyword should not be stored in the property but should be linked to a resource that contains the keyword. When a new document is added to the Synaptic Web "nodes" for new keywords should be created, but any keywords used before should be linked (i.e. there should be no duplicate keyword nodes).

```
<rdf:Description rdf:ID="keyword">
    <rdf:type rdf:resource="http://www.w3.org/1999/02/22-rdf-syntax-ns#Property"/>
    <rdfs:domain rdf:resource="#SynapticNode"/>
    <rdfs:range rdf:resource="http://www.w3.org/2001/XMLSchema#string"/>
</rdf:Description>
```

4. abstract: Descriptive abstract for the node, so a simple string will suffice.

```
<rdf:Description rdf:ID="abstract">
    <rdf:type rdf:resource="http://www.w3.org/1999/02/22-rdf-syntax-ns#Property"/>
    <rdfs:domain rdf:resource="#SynapticNode"/>
    <rdfs:range
    rdf:resource="http://www.w3.org/2001/XMLSchema#string"/>
</rdf:Description>
```

A link is also defined using the RDF model. First and foremost RDF statements (the subject, predicate, object triple) express a single property or characteristic of the subject. So if two resources are semantically related in more than one way there will exist more than one "link" between them. Having one link with lots of attributes (as in the conceptual design) and having lots of separate links basically amounts to the same thing. The main exception is that in the conceptual design (with only one link) there could be attributes that are "shared" between the characteristics that single link represents. With multiple links these shared attributes may have to be duplicated redundantly. Even this problem can be circumvented (if it ever occurred) by defining a new class of link to store these attributes on, this could be considered a parent to the other links. At the present time there are no properties that must be stored on every link but for future extensibility it may be convenient to define a link super-class similarly to the "SynapticNode" class from which all classes of links are derived.

```
<rdf:Description rdf:ID="SynapticLink">
    <rdf:type
    rdf:resource="http://www.w3.org/2000/01/rdf-schema#Class"/>
</rdf:Description>
```

The concept of links having a dynamic aspect is central to the Synapse solution. A property must be defined to embody the importance of the link. The value of this importance will be a "SynapticLinkWeight" class. Finally a general super-class for the predicate meaning the source and object are dynamically related is defined as follows.

```
<rdf:Description rdf:ID="SynapticLinkWeight">
    <rdf:type rdf:resource="http://www.w3.org/2000/01/rdf-schema#Class"/>
</rdf:Description>
<rdf:Description rdf:ID="SynapticRelatedTo">
    <rdf:type rdf:resource="http://www.w3.org/2000/01/rdf-schema#Class"/>
    <rdf:subClassOf rdf:resource="#SynapticLink"/>
</rdf:Description>
<rdf:Description rdf:ID="weight">
    <rdf:type rdf:resource="http://www.w3.org/1999/02/22-rdf-syntax-ns#Property"/>
    <rdfs:domain rdf:resource="#SynapticLink"/>
    <rdfs:range rdf:resource="#SynapticLinkWeight"/>
</rdf:Description>
```

Any links that are dynamic should therefore extend the "SynapticRelatedTo" class.

Hierarchical links are used to record that one resource is the "parent" of another.

```
<rdf:Description rdf:ID="HierarchicalLink">
    <rdf:type
    rdf:resource="http://www.w3.org/2000/01/rdf-schema#Class"/>
    <rdf:subClassOf rdf:resource="#SynapticLink"/>
```

-continued

```
</rdf:Description>
<rdf:Description rdf:ID="ParentOf">
    <rdf:type
    rdf:resource="http://www.w3.org/2000/01/rdf-schema#Class"/>
    <rdf:subClassOf rdf:resource="#HierarchicalLink"/>
</rdf:Description>
<rdf:Description rdf:ID="ChildOf">
    <rdf:type
    rdf:resource="http://www.w3.org/2000/01/rdf-schema#Class"/>
    <rdf:subClassOf rdf:resource="#HierarchicalLink"/>
</rdf:Description>
```

Directory links and nodes are used as directories for other links and nodes. Ordering within a directory branch is handled by the use of a sequence container within the directory node.

```
<rdf:Description rdf:ID="DirectoryBranch">
    <rdf:type
    rdf:resource="http://www.w3.org/2000/01/rdf-schema#Class"/>
    <rdf:subClassOf rdf:resource="#SynapticNode"/>
</rdf:Description>
<rdf:Description rdf:ID="DirectoryLink">
    <rdf:type
    rdf:resource="http://www.w3.org/2000/01/rdf-schema#Class"/>
    <rdf:subClassOf rdf:resource="#HierarchicalLink"/>
</rdf:Description>
<rdf:Description rdf:ID="DirectoryContains">
    <rdf:type
    rdf:resource="http://www.w3.org/2000/01/rdf-schema#Class"/>
    <rdf:subClassOf rdf:resource="#DirectoryLink"/>
    <rdf:subClassOf rdf:resource="#ParentOf"/>
```

-continued

```
</rdf:Description>
<rdf:Description rdf:ID="DirectoryIn">
    <rdf:type
    rdf:resource="http://www.w3.org/2000/01/rdf-schema#Class"/>
    <rdf:subClassOf rdf:resource="#DirectoryLink"/>
    <rdf:subClassOf rdf:resource="#ChildOf"/>
</rdf:Description>
```

The above RDF definitions form the basis of a general framework upon which the Synaptic Web may be built and customised for a particular application.

Client

Figure 3:
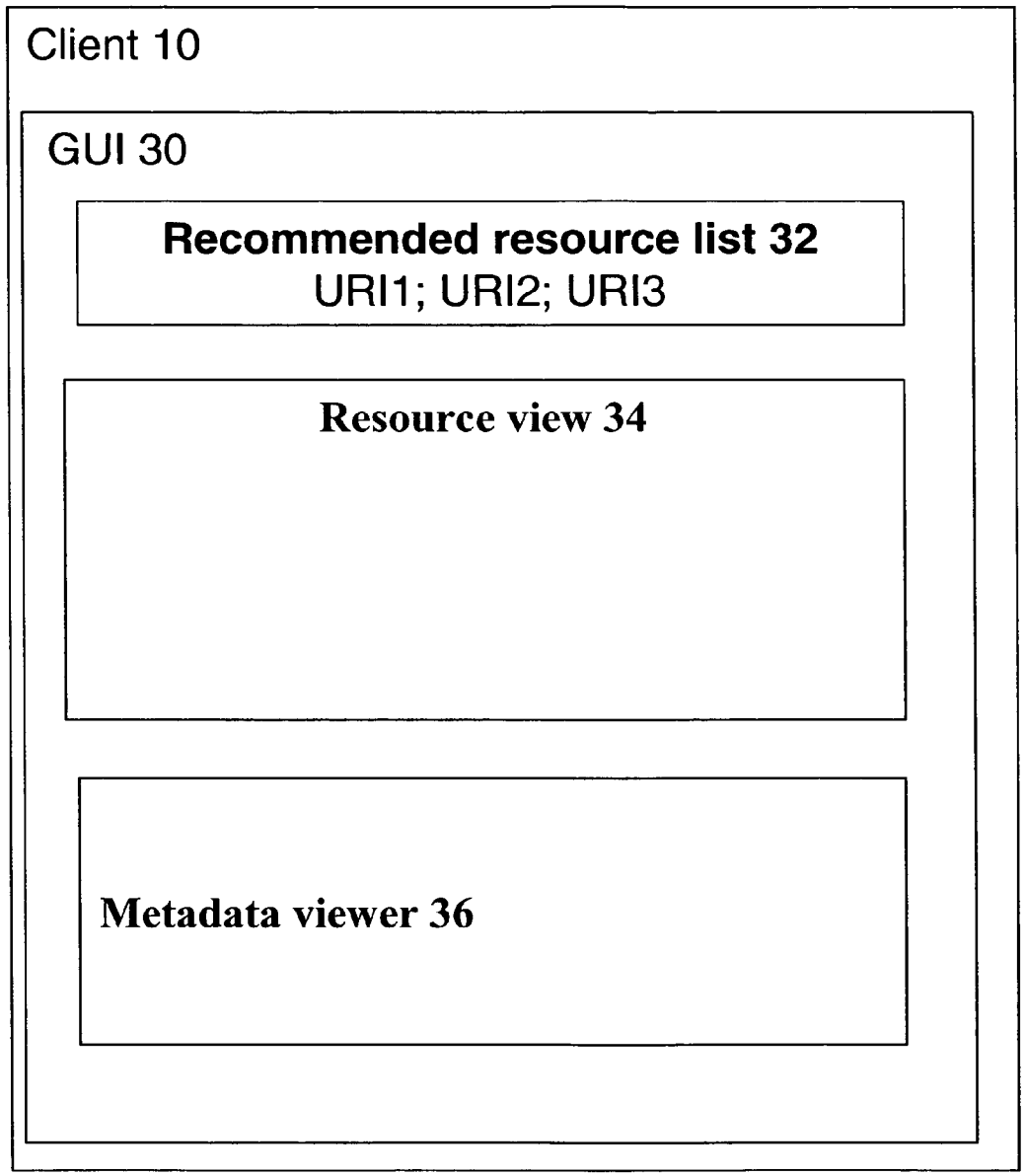
FIG. 3 is a more detailed schematic of the client.

FIG. 3 illustrates a client 10 of the preferred embodiment. Each client 10 comprises a graphical user interface (GUI) 30 for displaying: a recommended resource list 32; a resource viewer 34 for displaying a selected resource; and a metadata viewer 36 for displaying metadata for the selected node. The resources in the recommended resource list 32 can be displayed in order of resource importance. The resources in the recommended resource list 32 can be separated into categories e.g. resource type such as person resource and document resource. The user can select the type of categories displayed. The client presents a subset of the recommended node list that is received from the recommender agent. It will most likely be the whole set, but it may be a subset if, for example, the client doesn't have room to display all of the recommended nodes.

The recommended resource list 32 is a list of resources that are recommended by the recommender.

The navigator 14 receives the URI request. The selected node metadata is acquired and sent back from the navigator 14 to the client 10.

Figure 4:
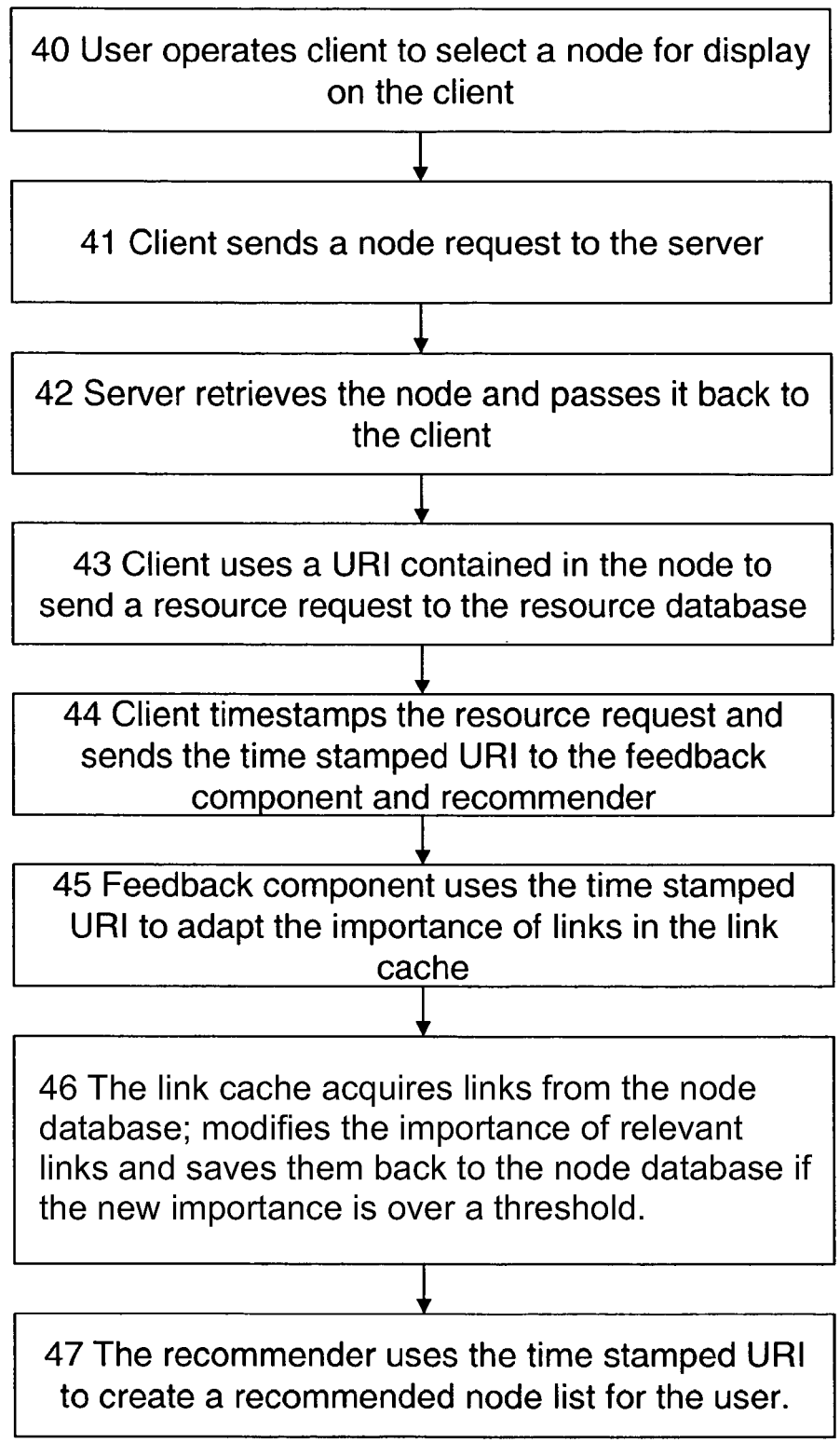
FIG. 4 is a schematic of a method of the synaptic server.

Referring to FIG. 4, the process of the system comprises the following steps: in step 40 a user operates the client to select a node 26A for display on the client 10; in step 41 the client 10 sends a node 26A request to the server; and in step 42 the server retrieves the node 26A and passes the node 26A back to the client. In step 43 the client 10 uses a URI contained in the node 26A to send a resource request to the resource database 24. In step 44 the client 10 timestamps the resource request and sends a time stamped URI to the feedback component 18 and the recommender 16. In step 45 the feedback component 18 uses the time stamped URI to adapt the importance of the links 28 in the link cache. In step 46 the link cache acquires links from the node database; modifies the importance of relevant links (e.g. 28T,28A,28B,28D) and saves them back to the node database if the new importance is over a threshold. In step 47 the recommender 16 uses the time stamped URI to create a recommended node list 32 for the user.

Feedback Component

Referring to FIG. 5, the feedback component 18 comprises: a general decay agent 50; an exposure decay agent 51; a basic agent 52; a time agent 53; a person agent 54; a person time agent 55; a transition agent 56; a collaborative agent 57; and a user navigation history 58.

The preferred embodiment of the invention uses all the above agents. However other embodiments of the invention can work with two or more agents. For instance, using the general decay agent 50 and the basic agent 52 allows the links 28 to grow and decay in accordance with user activity. However each of the other agents have their own advantages.

The user navigation history 58 is stored and updated for each user. Each user navigation history 58 is created the first time a particular user selects a node 26 and sends a timestamped URI from the client 10. Each navigation history 58 is a list of history entries—a node identifier (URI) and a timestamp (in milliseconds). Every time a user selects a new resource, a timestamped URI is received at the feedback agent and this is added as a history entry in the corresponding user navigation history 58. If the resource does not have a corresponding node 26 in the web then a generic 'non-synapse' identifier is sent. Each history has a maximum (customisable) size. When a user navigation history 58 is full and a new entry is added, the oldest entry is discarded.

After adding a newly received entry to a given user's navigation history 58, the feedback component 18 makes available both the user navigation history 58 and a user identifier to the feedback agents. The user identifier is the username that the user uses to log into the system and forms the basis of the user's Person Node URI. Each of these agents may use the resource request and the user navigation history 58 to modify links 28. A singleton 'navigation history store' class contains every user's navigation history. So the navigation history object can be obtained by calling NavigationHistoryStore.getInstance( ).getNavigationHistory(username).

Figure 6:
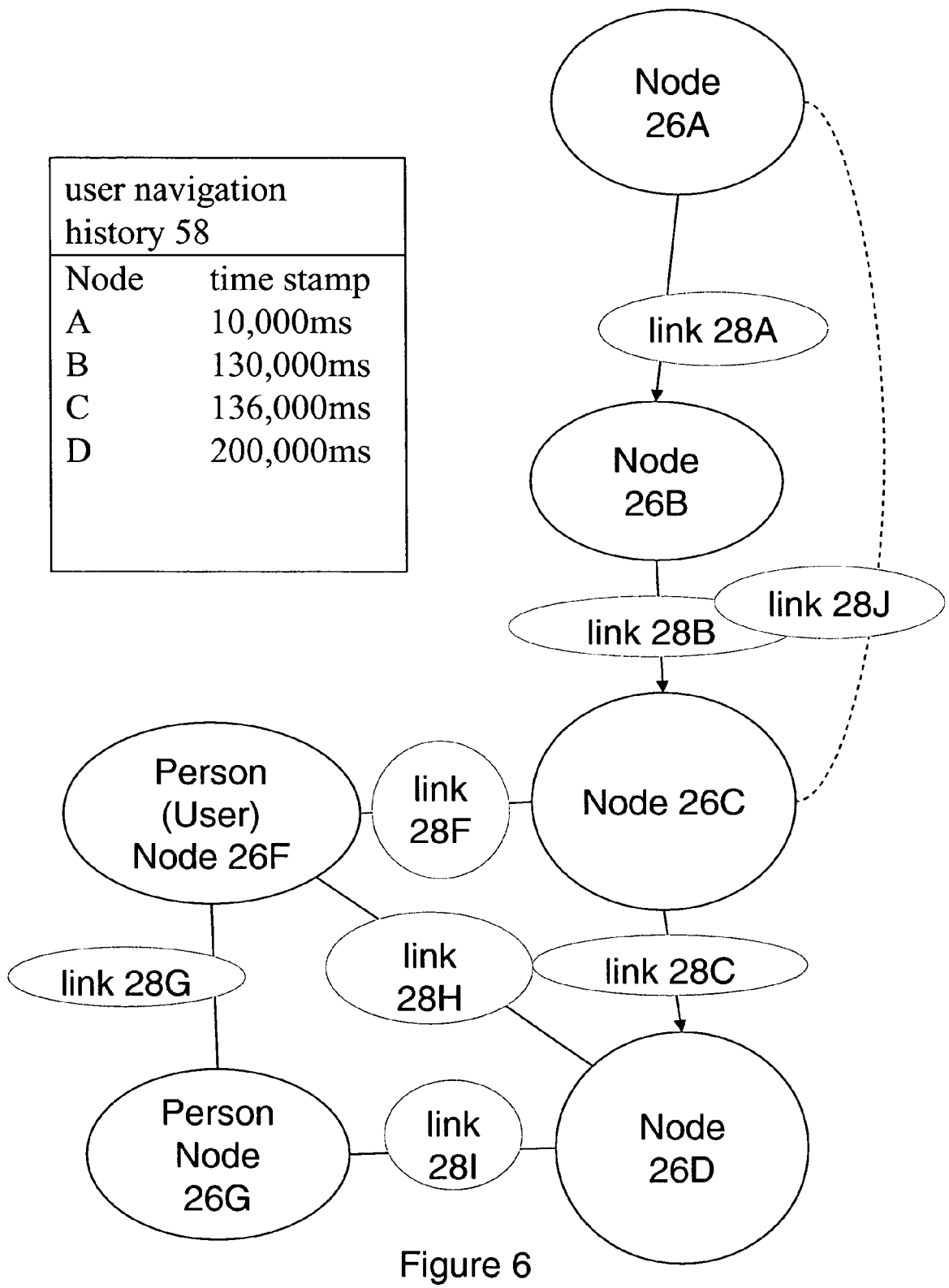
FIG. 6 is a schematic of a user navigation through several nodes.
Figure 7:
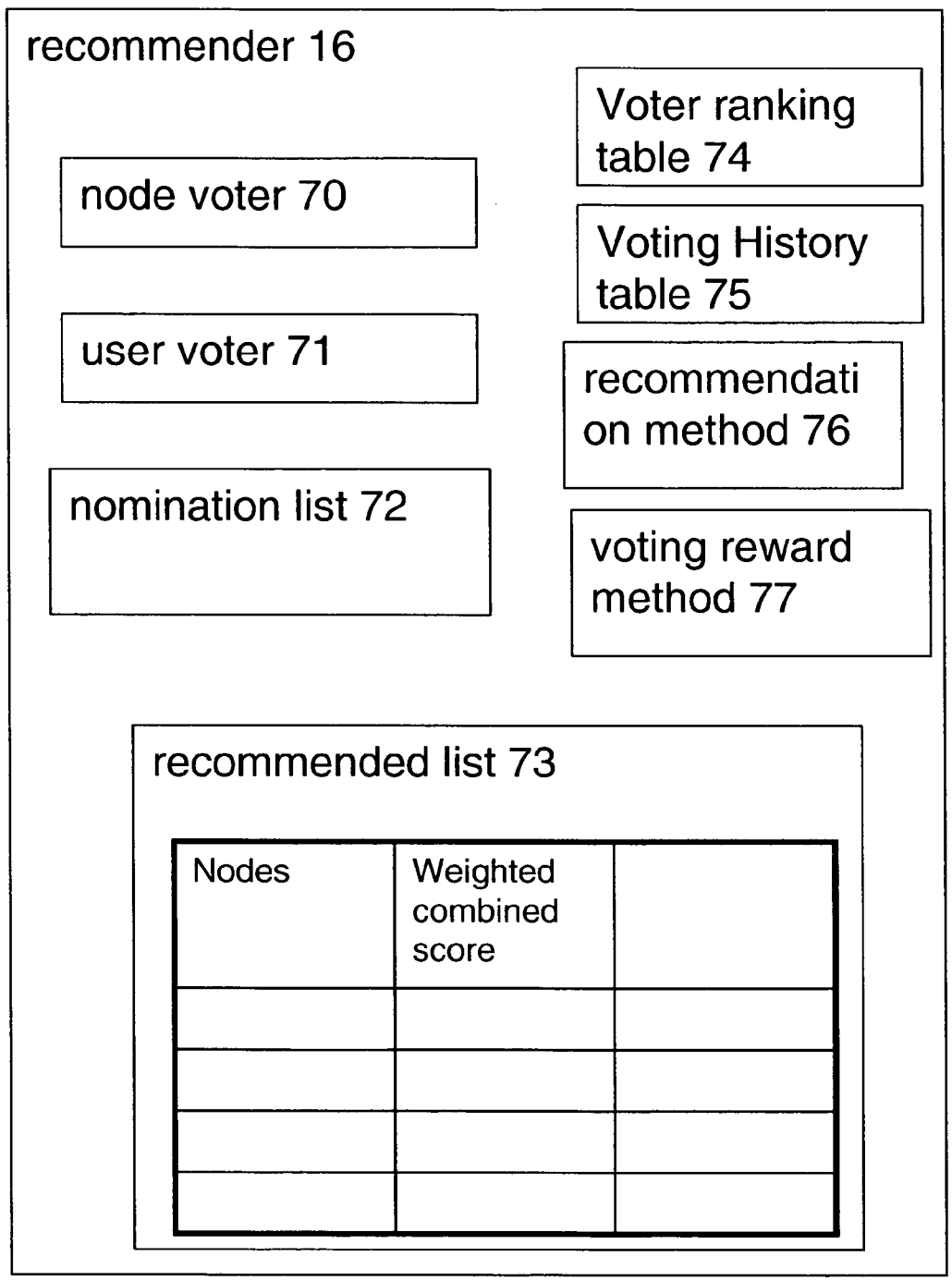
FIG. 7 is a schematic of the recommender.

FIG. 6 illustrates a special case of the example nodes and links from FIG. 2 for the purpose of explaining the operation of the feedback agents. Node 26F is a user node and node 26G is another person node. Nodes 26A, 26B, 26C and 26D are content nodes and the arrows indicate the user P's navigation path and direction of the link from node 26A to node 26B (link 28A) to node 26C (link 28B) and to node 26D (link 28C). Link 28F and link 28H are links from the user node 26F to content node 26C and 26D respectively. Link 28I links the destination node 26D to the person node 26G and link 28G links the two person nodes. The user navigation history 58 includes nodes and timestamps. The user's last transition was to node 26D which is the destination node; this is the last recorded transition in the navigation history 58 after a resource request was received by the feedback component 18. The resource request contains the name of the destination nodes and the time of the transition. Only shown FIG. 6 are the links that will change as a result of the last resource request message (the user node 26F requesting content node 26D). The current importance of the links is not shown because this will vary from embodiment to embodiment. The link between node 26A and node 26C is link J.

The general decay agent 50 decays all the dynamic links based on the general level of user activity. An activity factor is calculated at intervals by querying the navigation history for all users within the last time interval. All dynamic links are decayed in the web by an amount based on the activity factor.

The formula in our implementation is:

$$newImportance = oldImportance - (entries * 0.05 + 1) * 0.0001$$

where entries is the total number of entries in all users' user histories within the last 20 minutes.

The exposure decay agent 51 decays dynamic links based on the amount of exposure of the node to users navigating the source node of the link. Exposed nodes are the nodes displayed from the recommended node list on the client GUI for a particular user for each node that the user selects. Each time a new recommended list is generated it is made available to the client and the client displays a subset called exposed recommended nodes. A list of the exposed recommended nodes are sent to the exposure decay agent and the exposure decay agent then decays all the links from the user node to exposed recommended nodes. The amount by which each link importance is decreased is generally small compared to the link importance and depends on the total number of nodes that were exposed and a user factor. Formula—for each node that is 'exposed', two links strengths are changed:

1. The link between the currently displayed node and the exposed node:

$$newWeight = oldWeight - delta$$

2. The link between the user's person node and the exposed node $$newWeight = oldWeight - 1.5 * delta$$

Where delta=0.00008*(1+1/numLinks+0.4*log(1+userFactor) and numLinks=the number of nodes exposed together The user factor is used to both decay and grow links by the decay agents and is calculated by summing the strengths of all the user node links. The user factor is an indication of the amount time the user has spent navigating the web, especially recently as all of the links decay over time, and modifications to links on behalf of this user are made as a percentage of this.

The basic agent 52 increases the importance of the traversed link between two traversed nodes. The increase is based on the user factor. The formula we used (where log is the natural logarithm function) is:

Let modified=0.0065+0.0025*log(1+userFactor)

Case (oldImportance<0.8): newImportance=modified+oldImportance
Case (oldImportance>=0.8): newImportance 0.5*modified+oldImportance
If (newImportance>1): let newImportance=1

For instance, the basic growth agent looks at the last two nodes (C and D) in the navigation history and strengthens the link between them (link c) incrementally by the user factor.

The time agent 53 increases the importance of the penultimate link, that is the link traversed before traversing the last link from the origin node to the destination node. The size of the increase is based on the time spent on the penultimate node. For example, the time growth agent subtracts the two most recent times in the navigation history (D=20000 ms, C=136000 ms) to get the time that the user stayed at the penultimate node, 200000 ms−136000 ms=64 seconds. Based on this time it then modifies the link corresponding to when the user choose to move to C in the first place, i.e. the link from B to C, link b. 64 seconds is taken as an indication that node C was useful to the user in this context, so link b may be strengthened. If this time had been very short, say 5 seconds, then the strength of link b would have been decreased. The formula for the growth for the preferred embodiment is:

newImportance=oldImportance+delta*0.5*(0.65+0.25*log(userFactor))

where delta is determined as follows:
Case (T<30 seconds): delta=0.00002*(T/30−1)
Case (30 seconds<=T<300 seconds): delta=(0.0005/270)*T
Case (T>=300 seconds): delta=0.0005

The person agent 54 increases a link between the user's person node and the destination node. The size of the increase is based on a log of the user factor. A log scale is used so that small user factors do not dominate small user factors. For instance, the person agent strengthens the link between the user's person node and the node to which they have just navigated—link e in this case.

The person time agent 55 modifies the importance of the link between the user's person node 26F and the node that they have navigated from based on how long user spent at the destination node and the user factor. For instance, the person time growth agent works out how long the user stayed on node 26C in the same way that the time agent does (64 seconds in this case)—this gives an indication of how useful the node was to the user on this visit. The importance of link 28F between the user's node 26F and node 26C is changed accordingly—it would be increased slightly in this case.

The transition agent 56 increases a link or creates a link between a start node and an end node in a transition where there is one or more intermediary nodes between the start and end nodes. A transition is between two or nodes that are part of a user navigation. The time that a user spends viewing a node in the client is node time. An intermediary node is a node where the node time is less than a transition threshold time. The start and end nodes are nodes on which the node time is more than the transition threshold time. If the node time is less than the transition threshold time then the user is assumed to have been 'skipping past' the intermediary node. For instance, the transition agent is triggered when a node time is greater than the transition threshold time, in this case the node time for node 26C is 64 sec which is more than the preferred transition time of 10 sec. The transition agent walks back along the user history, looking at time differences. The node time of 26B is 136−130=6 seconds which is shorter than the 10 second transition threshold time so it carries on. The node time of 26A is 130−10=120 seconds which is above the transition threshold time so the agent stops here and assumes that the user went from 26A to 26C and skipped past 26B. Therefore the link between 26A and 26C (link J) is created or strengthened based on the total time taken to do the traversal. In this case 6 seconds is quick so the increase in strength would be greater than average.

The collaborative agent 57 modifies the importance of links between users who work on the destination resource. The collaborative agent is triggered by the person agent increasing the link between the user node and destination node. The collaborative agent increases the links between the user's node and linked person nodes. The increase depends on the corresponding link importance and the increase of the user node and destination.

```
double weightFrom = link.getWeight( );
    double weightIncrease =
        (1 + weightFrom) * 0.5 * 0.0001;
    if (weightFrom < 0.3)
    {
        weightIncrease *= 0.25;
    }
```

For instance, in FIG. 5, the collaborative agent looks at the person nodes linked to the destination node 26D excluding the user node 26F. In this case person node 26G is found. The link between the user node 26F and person node 26G, link 28G, is then created or strengthened by an amount that depends on the strength of link 28I between the person node 26G and the destination node 26D.

Other agents could be used to change link importance, for example email or instant messaging communication between people could influence the importance of the links between people nodes.

Recommendation Agent

Navigation in the server generates a recommended node list for each node request received by the navigator. The recommender 16 comprises: a node voter 70; a user voter 71; a nomination list 72; a recommended list 73; a voter ranking table 74; a voting history table 75; a recommendation method 75; and a voting reward method 76.

The node voter 70 nominates every node 26 that has a link 28 from the requested node. The node voter 70 votes for the nominated nodes with a value based upon the importance of the link between the nominated node and the requested node.

A user voter 71 does not nominate any nodes in the preferred embodiment. Given a short list of nominated nodes, it checks to see whether the user node (e.g. 26F) has a link to any of the nominated nodes and votes according to the importance of the link between the user node and the nominated node. If no such link exists it votes zero.

The voter ranking table 74 ranks each of the voters (in the preferred embodiment just the node voter 70 and the user voter 71) against each of the users according to a weight. The voter ranking table 74 is a set of per-user weightings for the voter, in this way some voters have more influence than others. In particular one voter may have more weight for some users than other users. The set of voter rankings for each user is adjusted based on which node the user actually chooses from the recommended nodes.

Figure 8:
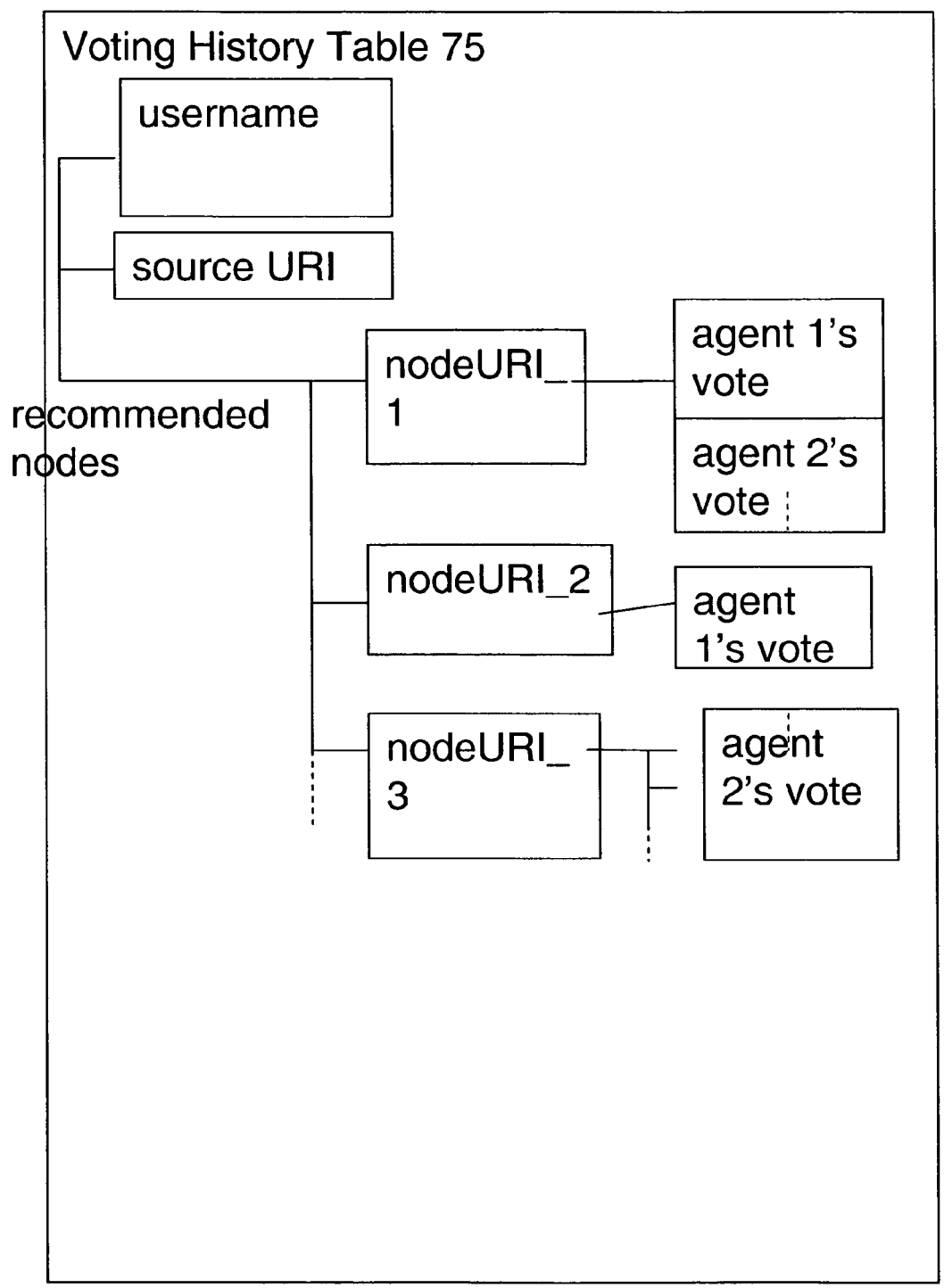
FIG. 8 is a schematic of a voting history example.

A voting history table 75, (also see FIG. 8), collects the voting patterns of the voters which is used by the voting reward method to maintain the voter ranking table.

Figure 9:
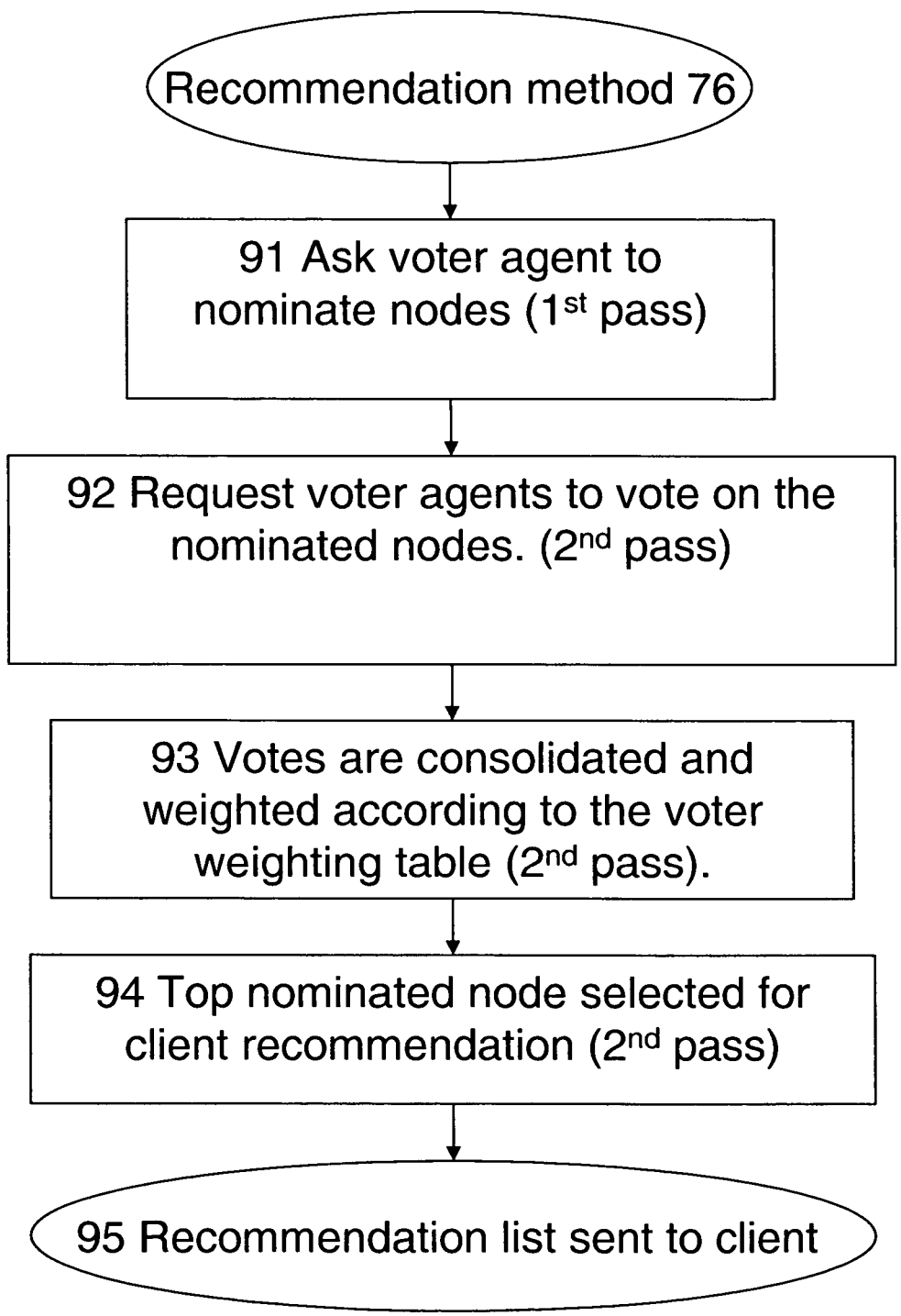
FIG. 9 is a schematic of a recommendation method.

A schematic of the recommendation method is shown in FIG. 9. The recommendation method 76 comprises two passes. First pass: in step 91 voter agents are asked to nominate nodes to be included in a nomination list. In the preferred embodiment only the node voter nominates nodes but in other embodiments one or more of the other voters can nominate nodes for merging into a single nomination list. Second pass: in step 92 each of the voters are asked to vote for each node nominated in the nomination table. Each voter assigns each node in a score between 0 and 1. A voter may have no preference for some nodes and give such nodes a vote of zero. In step 93 the votes for each node in the nomination list are weighted based on the voter ranking table and combined to give an overall score for that node. In step 94 the combined recommended nodes are sorted in order of overall score and the top scoring nodes selected. In this embodiment the top five are selected. In step 95 these nodes, along with their scores, comprise the final list of recommendations to be sent to back to the user.

Figure 10:
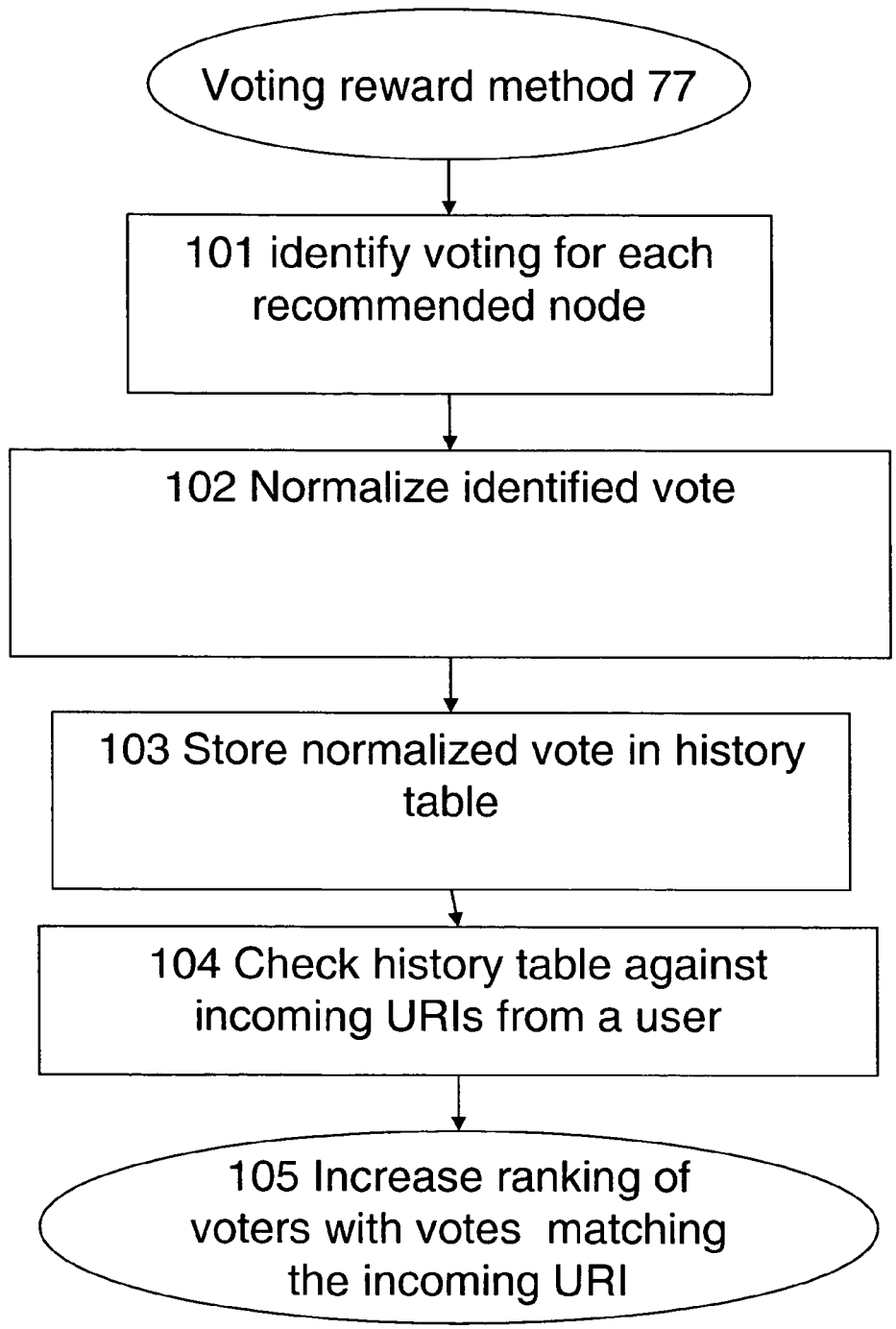
FIG. 10 is a schematic of a voting reward method.

The voting reward method 77 is described with reference to FIG. 10. In step 101, for each node in the final recommended list, each of the voter's votes are identified. In step 102, the identified vote is normalised by dividing by the sum of all the voters votes. In step 103, the normalised votes are stored in a history table with the requested node URI and the user node URI for the user to whom they are being sent. In step 104, the recommender checks 104 the history table for a user and the node when a node request is received by the recommender from that user. If found, the voters which voted for the requested node have their vote weighting increased for that user depending on the magnitude of their (normalised) vote (step 105).

In the preferred embodiment the node voter and the user voter are the only two voters. However, in other embodiments, there are other embodiments including a team voter and a node type voter. A team voter nominates nodes that have strong links to person nodes. A node type voter nominates nodes based on their type. For example, a programmer would be interested in source code nodes.

Link Cache Detail 'Active Cache'

Figure 11:
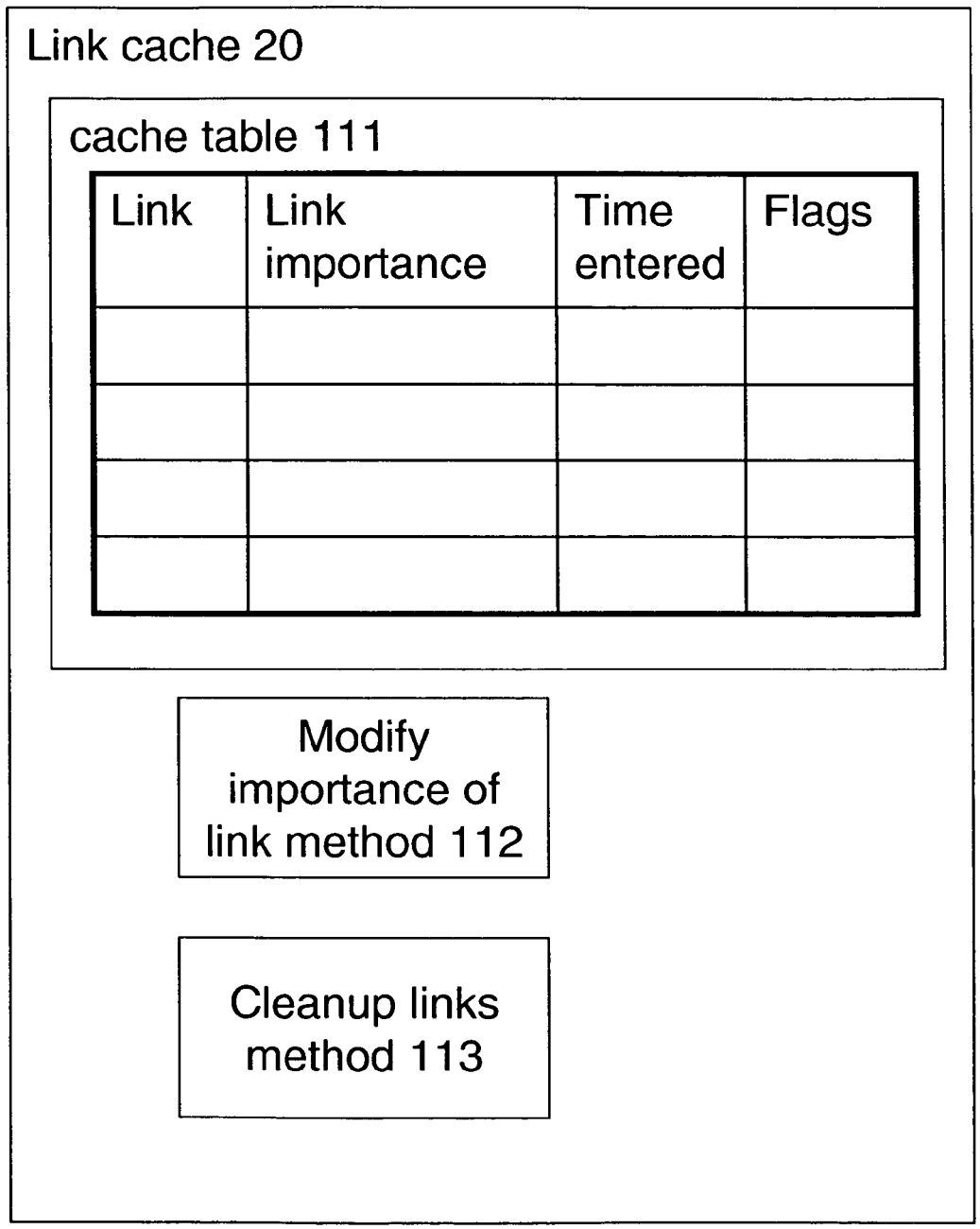
FIG. 11 is a schematic of the link cache.
Figure 12:
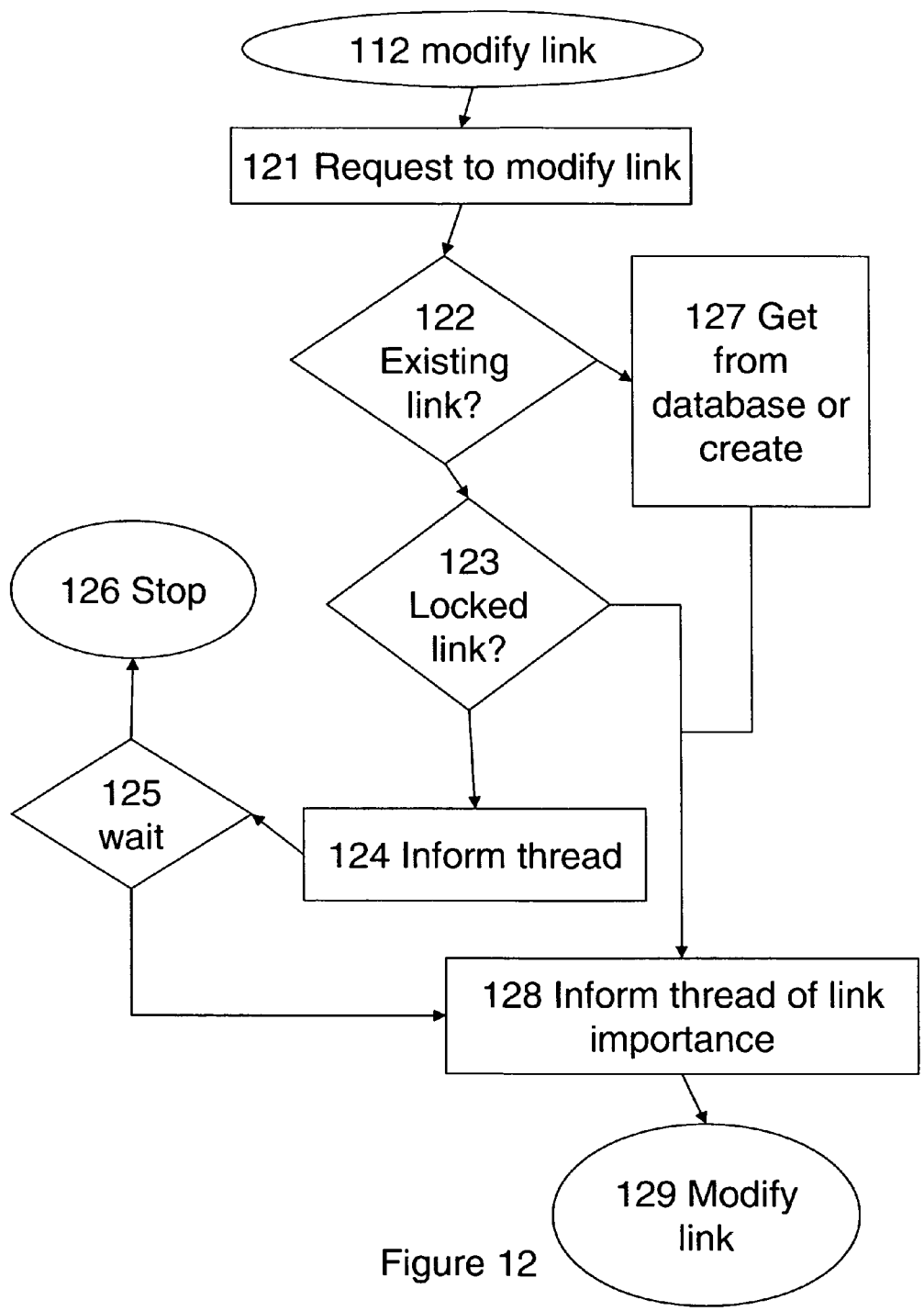
FIG. 12 is a schematic method for modifying the link importance in the link cache.
Figure 13:
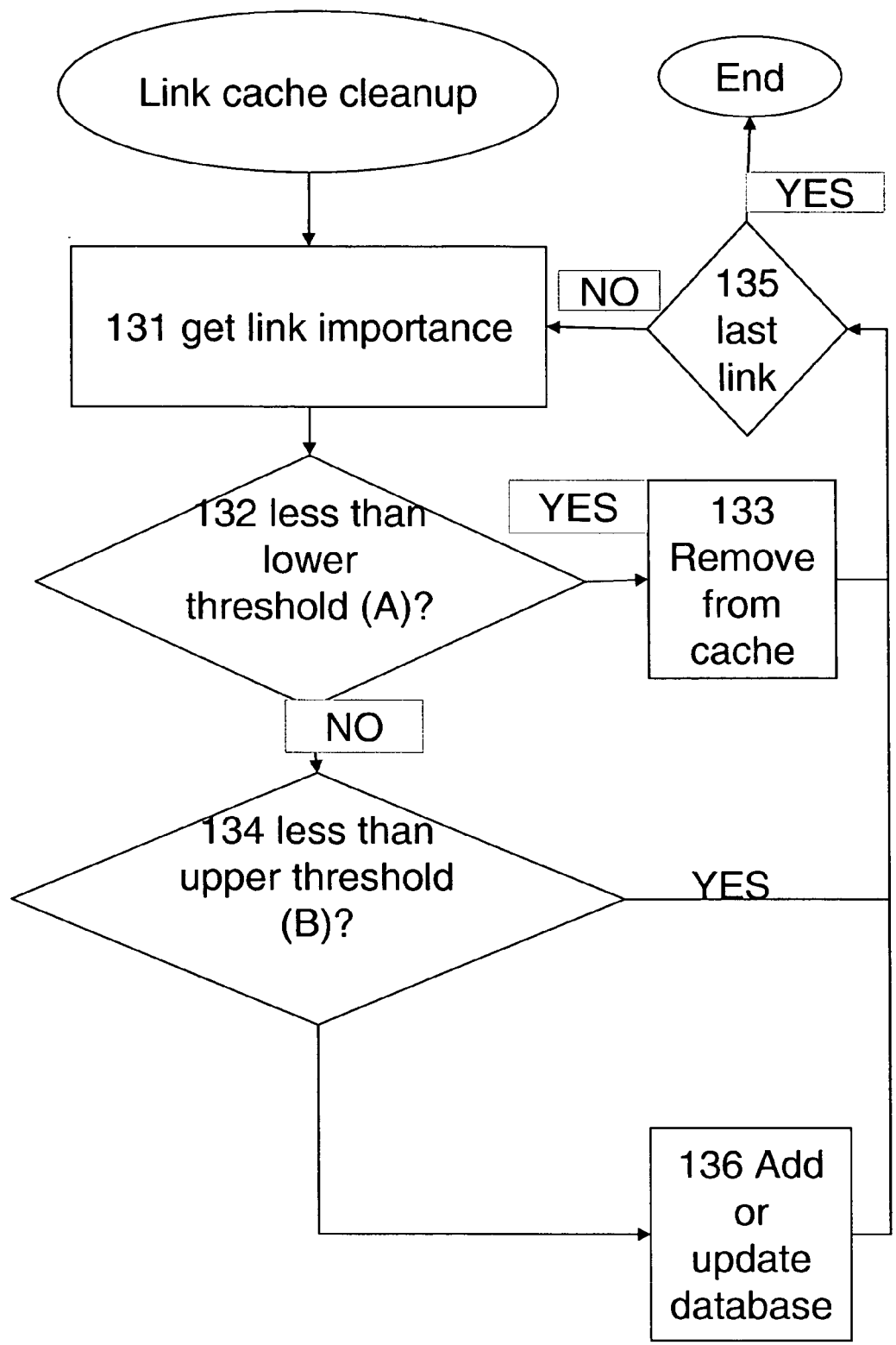
FIG. 13 is a schematic of the method for cleaning up the links in the link cache.

Referring to FIG. 11 the link cache controller comprises: a cache table 111; a method for modifying the importance of the link within the cache 112; and a cleanup link method for cleaning up links from the cache 113. The cache table 111 comprises a plurality of link entries. Each link entry comprises: a link identifier (based on the to and from nodes); a link importance; a time that the link entered the cache and a flag. In this embodiment the time that the link entered the cache is used to track the link but other information can be used instead.

The method for modifying the importance of a link 112 comprises the following steps. Step 121, when an agent wants to modify a link it requests the link cache to lock the link. Step 122, if the link cache currently has an entry for the link requested, the link cache checks (step 123) whether the link is locked by another thread and informs (step 124) the thread if so locked. In step 125, the requesting thread may choose to wait or continue (to step 128) without the link. If it waits, the process stops (step 126) and link is checked out to the requesting thread when it becomes available or when the other thread finishes or the lock on the link times out. If the cache does not have an entry for the link requested, the link cache attempts to get (step 127) that link from the database. If successful it adds this link to the cache and checks out the link to the requesting thread. If unsuccessful, i.e. the database doesn't contain a dynamic link between the two nodes (in the specified direction), a zero weight link is created in the cache (not the database) and checked out to the requesting thread. In any case where the link is checked out, a copy of the link is given to the requesting thread which is tagged with a unique ID. The link's entry in the cache is then locked by the link cache so that it cannot be checked out by other threads. After reading the link's importance (step 128), the thread may or may not choose to modify it. If it does not want to modify the link's strength, link cache releases its lock on the link which makes it available to be locked by other threads. If it modifies (step 129) the link, it can 'commit' that link back to the link cache whereby the link cache checks to make sure the ID tag is valid and if so updates the link's entry in the cache with the one that the thread has committed. The link's cache entry is also unlocked.

The link cache's cleanup link method 113 is invoked at regular intervals. A time interval between 10-30 minutes is typical for a dozen users. In other embodiments with larger numbers of users and links the cleanup function will be invoked more often or whenever the link cache size reached a certain limit. All the links except for those that have been added since the last cleanup are subject to the cleanup function. The following steps are performed for each link: a link in the cache is fetched (step 131) and if (step 132) the link importance is less than or equal to a lower threshold value (A) then the link is removed (step 133) from the database. If (step 134) the link importance is less than an upper threshold value (B) then the cleanup routine moves (step 135) on to the next link entry without removing or updating. If the link importance is more than the upper threshold (B) then the link cache adds or updates (step 136) the database with the link importance. The cache does not add 'new' links into the database if they are below the upper threshold (B). This is because many very weak links will be created which will then decay and be deleted. There is no point in creating these in the database just to be deleted soon after—an increased overhead due to 'unnecessary' database operations.

In the preferred embodiment the threshold range of the link importance defines if a particular link is removed from the cache or if the cache updates the database. In another embodiment the magnitude of change in the link importance could determine whether the link is removed or refreshed. In yet another embodiment the frequency of the modification to the link importance could determine the whether the link is removed or refreshed. However, in all the embodiments, it is the link importance value that determines the cache removal or refresh.

Annotation Management

Many spheres of human activity accumulate data and other resources, but rarely do we capture and then go on to exploit the relationships between such resources. Although these relationships might be simple associations, such as "AX is derived from A", many associations carry additional information in the form of an annotation. For example, "AX refines A by removing the ambiguity about who is responsible for access control. The administrator is responsible". In the preferred embodiment of Synapse such annotations are first-class objects, they have a lifecycle. For Synapse, the software development process was chosen as the model activity. Associations between development resources were implemented with dynamic links, thereby modelling the evolutionary part of the annotation lifecycle. Using Synapse it is possible to manage annotations through their lifecycle, making full allowance for the evolution of annotation objects and their dynamics. The method can be represented by a finite state machine, which represents the evolution of annotation objects.

Other annotation management systems do not treat annotation nodes as first-class objects that have a lifecycle. As first-class objects, annotation nodes can be addressed directly and flexibly. Moreover, annotations can evolve into resources in their own right since Synapse allows nodes to be resources. The importance of annotation nodes, especially in the provenance context, is increasingly being recognized, not least in academia.

Management of the annotation nodes relies on indirect control of the annotation state. As part of their specialization, annotation nodes have an annotation string and a time stamp and maintained state. All nodes maintain links from the Node to other Nodes. Links have importances which represent the significance of the link. The evolution of the link importance allows the state of the Annotation to be inferred, and its lifecycle to be controlled.

A node can have the following states: new; modified; overridden; and moribund. A new node is associated with the following methods applied: create; override; and update. A modified node is associated with the following methods applied: update of a new node; reinstate of overridden node; depreciate to a moribund node. A overridden node is associated with the following methods: override of a new node; override of a modified node; and depreciate to a moribund node. A moribund node is associated with the following methods: depreciate from a modified node or overridden node; and delete.

The create is the construction of the annotation node, with the initial annotation string. The initial links comprises links to the author and subject of the annotation, with importance value set to "strong". The update method is the modification of the annotation string; the act of modifying the annotation node increases the importance of the links from the annotation node to other nodes. The override method is the replacement of this annotation node by another. When a new annotation node links to a node, it can be set to override an existing annotation node, in due course causing the importance of the links to the overridden annotation node to decrease, optionally to zero. Initially, the importance of the link from the new annotation node to the one it replaces is set to strong, although that importance is likely to decay rapidly. The reinstate method is the reverse of the override process. The deprecate method is the consequence of a significant reduction in link weights that occurs either automatically or semi-automatically. Delete is the consequence of a reduction of link weights to zero. The period over which the link weights must remain at zero before a moribund Annotation is destroyed is configurable.

The essential feature of the annotation management is that the annotation lifecycle is maintained by the Synapse system. Only the 'create' and 'update' methods require direct modification of the annotation node, because they alter the content, specifically the annotation string. All other changes occur as responses to changes in the link importance. Link importance change dynamically, with the majority of such changes being themselves autonomic Disconnected Resources If the resource within the network becomes unconnected there would be no way to navigate to that resource. Clearly it is very important this does not happen, and the server implementation should ensure that it cannot occur. However, even with the best laid designs mistakes can be made or data corrupted so a process to check for connectivity seems a sensible utility. There is a further complication here because a resource that is disconnected in the sense that it is not possible to navigate to any of its resources could possibly still have normavigable links to the rest of the network. So some understanding of the type of links should be built into the algorithm. As this problem is basically the same as confronted by a garbage collector it should be relatively straightforward to implement such a utility.

Applications

The preferred embodiment for built for a large software development project having a large number of resources, many of which being related in some way. Such resources include research documents, specification documents, test plans, source files, and employees. The embodiment can be applied to such an environment by associating nodes will all such resources. We have identified two top-level node types: content nodes and person nodes. Content nodes would include all sources files, documentation, and external API references, while there would be a person node associated with each employee involved in the project.

Plug-ins for tools used to access these resources (for example the Eclipse IDE) would be developed which communicate via some well-defined interface with a central server storing the web information. Users could then navigate the web on their own workstations and when accessing a particular document, a list of related documents would be offered generated based on the existence and strength of any semantic links from the corresponding node in the web. The user following any of these links would cause the client plug-in to send this information to the server which would be used to make adjustments to link strengths.

This act of a user moving between documents would not only influence the strength of the link between these documents but also the strength of the link between the user's own node and the document they have navigated to. It would also have a small effect on the strength of the link between this user and any other users who have a strong link with the second document. The client could also record additional information such as the length of time the user spends modifying or simply viewing the document. This would then influence the extent of the change in link strengths.

Plug-ins for other systems (such as internal instant-messaging servers) would monitor other types of interactions (e.g. users communicating with each other) and send this usage data to the server (to increase the strength of the link between the two users). Internal' factors could also be used—for example direct links appearing when there is high transitive strength between documents. The way in which links fade may vary depending on the amount of time-relevancy desired. There would be the facility to include 'static' attributes with links so that an organised structure can be given to the web as well as the dynamic semantic structure; for example linking the people in a management type hierarchy.

Further applications include: a semantic network between news stories could be created that allows users to navigate through related articles. Educational and reference material, including encyclopaedias and tutorials could be structured using Synapse, perhaps with relevant links to information on the WWW. Synapse might be used by an e-commerce vendor to structure product descriptions in their online catalogue. A team of lawyers would be able to organise the data of a case and use the group enviroment to locate key relationships between key items of data.

The invention claimed is:

1. A computer implemented method for managing resources, said resources including content resources and people resources, wherein said resources are modeled like a network having a plurality of nodes, comprising:

maintaining the plurality of nodes representing said resources, said nodes including content nodes and person nodes and are linked according to their semantic relationships, wherein each node of said nodes contains a resource reference for referencing a resource;

maintaining links representing relationships between the resources, said links including links between content nodes, between person nodes and between content and person nodes, each link comprising node references to identify the nodes in the relationships and an importance value to identify an importance of the relationship;

presenting an interface for selecting one of the content nodes or person nodes by a user;

changing, in response to a single selected node being selected by the user, importance values of certain ones of the links, wherein some of the certain ones of the links are set to have a higher importance value and other of the certain ones of the links are set to have a lower importance value;

determining, in response to the single selected node being selected by the user, a node having a likelihood of subsequent selection based on the importance value of the node's link to the selected node;

accessing a user navigation history of time-stamped user requests for previously requested nodes requested by the user; and dynamically modifying the importance value of the link to the selected node using the user navigation history;

wherein the estimating step comprises building a nomination list of nodes using a first nominator and voting on the nomination list of nodes using a first voter and a second voter, wherein the first voter votes for one of the nominated nodes with a value based upon the importance of the link between the nominated node and the selected node, wherein the second voter votes according to the importance of the link between the user node and the nominated node, and wherein the first nominator nominates every node that has a link from the selected node.

2. The method as in claim 1 wherein the adapting comprises decaying the links based on user activity while increasing the particular links based on traversal of those links.

3. The method as in claim 2 wherein user activity is an average of link importance values for all the links for all users within a time interval, and wherein decaying of the links is also based on an average of the importance values of all the user links for a particular user.

4. The method as in claim 2 further comprising;

decaying links based on an amount of exposure of the node to users navigating the source node of the link;

updating, for each user, a user navigation history of node identifiers and a timestamp; and increasing a link between the user's node and the destination node.

5. The method as in claim 2 further comprising modifying the importance of the link between a person node of the user and a navigate node that the user navigated from based on how long the user spent at a destination node.

6. The method as in claim 2 further comprising increasing the importance of a link between a start node and an end node in a transition in response to determining that there is one or more intermediary nodes between the start and end nodes.

7. The method as in claim 2, further comprising modifying the importance of links between users who work on the selected node.

8. The method as in claim 1 further comprising conditionally updating a given link in persistent memory from cache memory based on a change in the importance value of the given link.

9. The method as in claim 8 further comprising removing the link from cache memory if the link importance is less than a first threshold value;

updating the link in persistent memory if the magnitude of the importance value of the given link is more than a second threshold value; and updating the link in persistent memory if the change in the importance value of the given link is more than a third threshold value.

* * * * *